Figure 1:
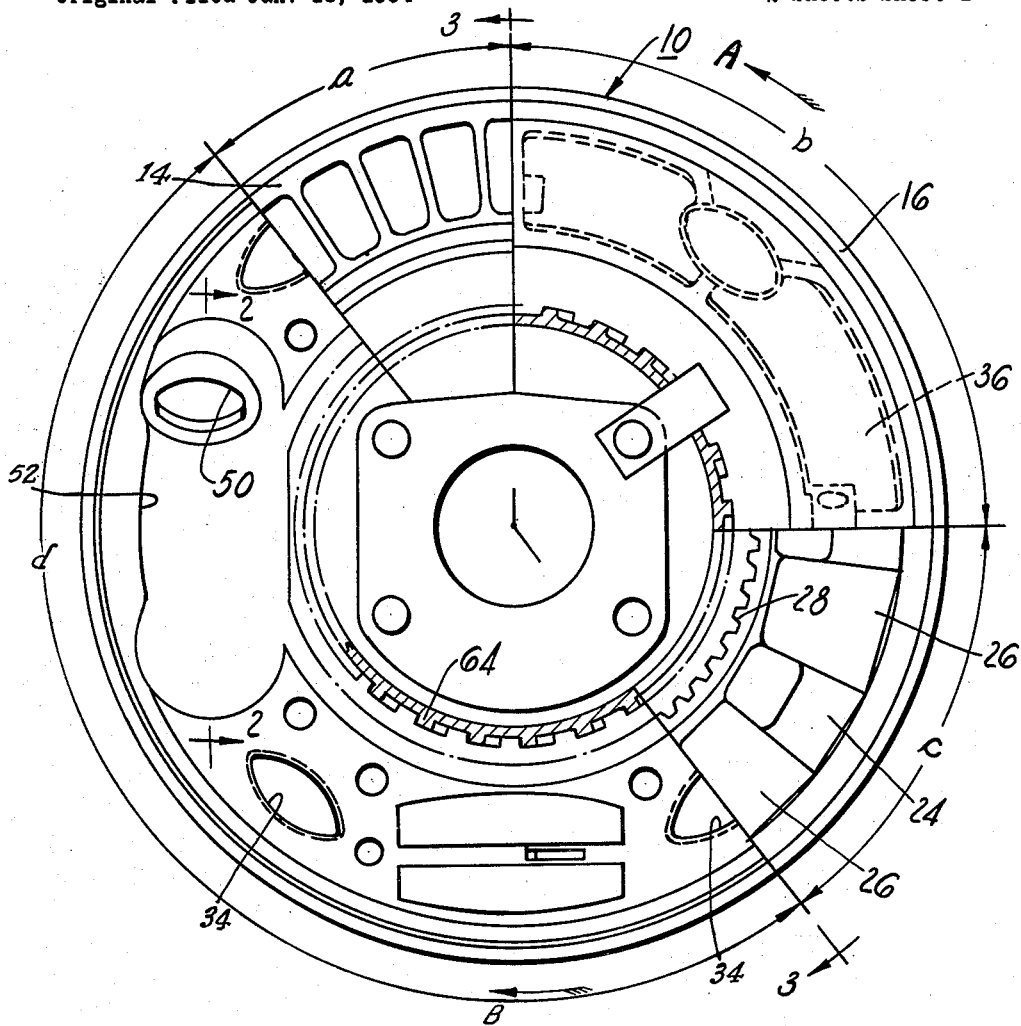

INVENTOR.
RICHARD T. BURNETT
BY
Sheldon F. Raizes
ATTORNEY

July 9, 1963  R. T. BURNETT  3,096,855
DISK BRAKE

Original Filed Jan. 13, 1954  2 Sheets-Sheet 2

INVENTOR.
RICHARD T. BURNETT
BY
ATTORNEY

3,096,855
DISK BRAKE
Richard T. Burnett, South Bend, Ind., assignor to The Bendix Corporation, South Bend, Ind., a corporation of Delaware
Original application Jan. 13, 1954, Ser. No. 403,672, now Patent No. 2,955,681, dated Oct. 11, 1960. Divided and this application Aug. 8, 1960, Ser. No. 48,160
2 Claims. (Cl. 188—72)

This invention relates to disk brakes and more particularly to improvements in disk type brakes wherein the friction-producing elements are self-energizing components of the brake. This application for patent is a division of my copending application Serial No. 403,672, filed January 13, 1954 (now U.S. Patent No. 2,955,681).

An object of the invention is to provide improved torque receiving and transferring means for disk braking.

Another object of the invention is to provide a disk brake with a pressure plate and a reaction member carrying a reaction plate, both of which plates engage a rotor disk for retarding movement of the same, wherein either the pressure plate or the reaction member transfers torque to a stationary support member depending on the direction of rotation of said rotor disk.

The above and other objects and features of the invention will appear more fully hereinafter from a consideration of the following description, taken in connection with the accompanying drawings, wherein a plurality of embodiments of the invention are illustrated by way of example.

Figure 2:
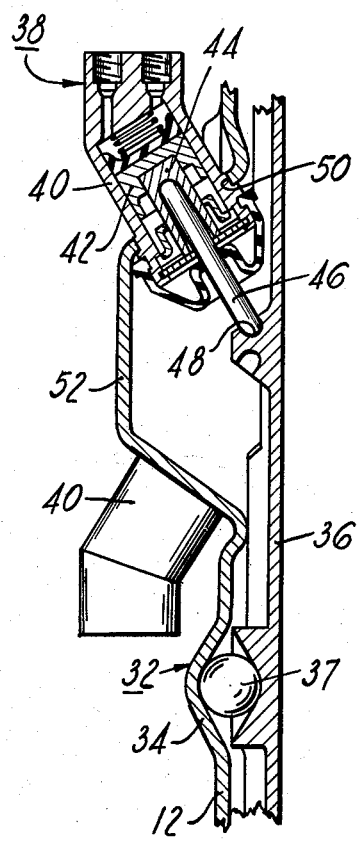
Figure 3:
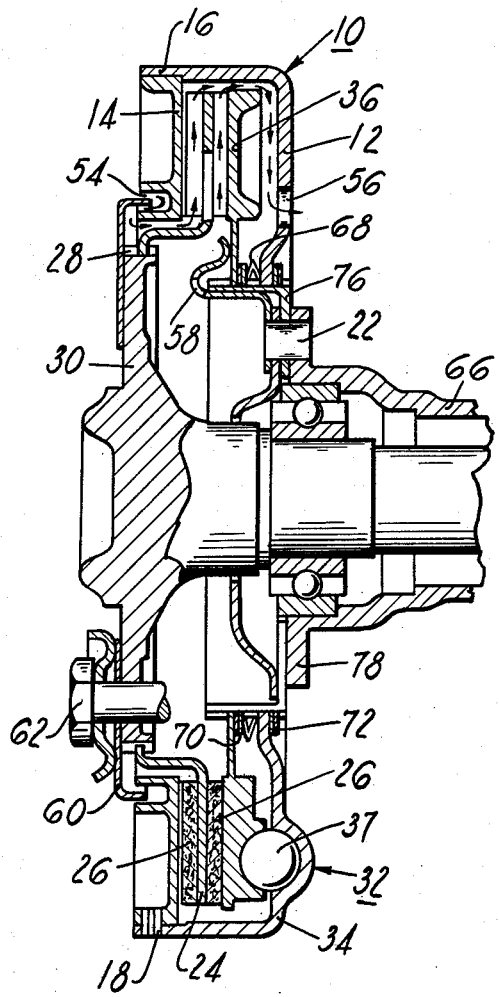

In the drawings:

FIGURE 1 is a composite view of a disk brake illustrating in segments; (a) the outer surface of a brake reaction plate, (b) a section of the brake assembly taken on a plate passing between a pressure plate and rotor looking toward the inboard side of the brake, (c) a section of the brake assembly between the rotor and reaction plate looking toward the inboard side of the brake, (d) is a section view of the brake viewed in a plane passing between the pressure plate and backing plate, viewed toward the inboard side of the vehicle;

FIGURE 2 is a fragmental section view taken on line 2—2 of FIGURE 1 and illustrating the actuating means for applying the brake; and FIGURE 3 is a section view of the brake assembly taken on line 3—3 of FIGURE 1.

Referring to FIGURES 1 and 3, a U-shaped cross section member designated generally by reference numeral 10 is splined at 64 to a cup-shaped nonrotatable member 76. The U-shaped cross section member 10 consists of a backing plate 12 and a reaction plate 14 arranged in parallel relationship to the backing plate and secured to a substantially cylindrical flange 16 of the backing plate 12 by a plurality of fastening members 18.

A rotor 24 having a plurality of friction pads 26 on either side thereof has a splined connection 28 with a rotatable member such as axle flange 30. A plurality of camming devices 32 consisting of ball-ramp combinations are interposed between pressure plate 36 and backing plate 12. The camming devices 32 consist of oppositely facing ramps 34 having a ball 37 associated therewith and adapted to ascend the ramp portions upon relative circumferential movement of the pressure plate 36 and backing plate 12. As the ball 37 mounts the ramps 34, it imparts axial applying thrust on the pressure plate 36 causing engagement with the rotor 24.

Two spring washers 68 are compressed between retaining ring 70 and support 12 thereby urging the latter into engagement with retaining ring 72. Return springs 58 are used to yieldably urge the pressure plate 36 to retracted position. The backing plate 12 and the pressure plate 36 have splined connections 64 and 74 with a cup-shaped member 76 secured by fastening means 22 to a flange 78 on axle housing 66. These splined connections allow a limited movement of the pressure plate 36 in one direction of rotation and a limited movement of the backing plate 12 in the other direction of rotation.

Referring to FIGURE 2, operator-controlled hydraulic actuator 38 is operatively connected to pressure plate 36. The hydraulic actuator 38 consists of a wheel cylinder 40, a piston 42 reciprocably received therein, a sleeve 44 positioned in the head of said piston 42 and a thrust link 46 operatively engaging an abutment 48 on the pressure plate 36. The actuator 38 is received through an opening 50 in the support member 12. The support 12 is dished at 52 to accommodate the actuator.

In the present illustration of the invention, two oppositely located wheel cylinders are used. The actual number of wheel cylinder actuators is a matter of design preference; the number actually disclosed here is only for purposes of exemplification.

Openings 54 in rotor 24 permit circulation of air on either side of the rotor, the air then being expelled through openings 56 formed in the backing plate 12. This circulation of air as a coolant through the brake assembly as shown by arrows in FIGURE 3 produces lower operating temperatures thereby reducing thermal effects on the braking operation.

The brake assembly is provided with a dust cover 60 which may be secured to the rotatable axle flange 30 in some suitable manner such as by bolts 62.

The operation of the novel brake mechanism during forward rotor rotation in the direction of arrow A is as follows:

Operator generated fluid pressure from an appropriate master cylinder source (not shown) causes movement of the piston 42 (see FIGURE 2) in a generally downward direction. This movement of the piston brings about axial and circumferential movement of pressure plate 36 thereby engaging pressure plate 36 with the rotor 24. The splined connections 74 and 28 of the pressure plate 36 and rotor 24 permit axial movement of both these members to bring about frictional engagement of the rotor 24 and reaction plate 14. When the pressure plate 36 contacts the rotor 24, it undergoes slight circumferential movement whereupon camming devices 32 produce additional axial thrust thereon, clamping the rotor 24 between the pressure plate 36 and reaction plate 14.

The torque reaction from frictional interengagement of the pressure plate 36 and rotor 24 is transmitted through the camming devices 32 to the backing plate 12 having a splined connection with cup-shaped member 76 which transfers the torque reaction to the nonrotatable axle housing 66. Torque reaction from engagement on rotor 24 with reaction plate 14 is transmitted to the backing plate 12 by pins 18.

Referring to segment d of FIGURE 1, the splined connection 64 between the backing plate 12 and cup-shaped member 76 is so designed that the interfitting notches contact immediately to resist relative turning of the backing plate 12 and member 76 in one direction. That is, the backing plate anchors on splined connection 64 in braking forward rotation of rotor 24 as torque reaction is transmitted thereto via the camming devices 32 and pins 18.

It is necessary that the rear wheel brakes do not diminish in effectiveness with reverse rotor rotation in the direction of arrow B because of the reduced effectiveness of the front wheel brakes. The anchoring action of the backing plate 12 against the cup-shaped member 76 with reverse vehicle motion would de-energize the brake, therefore anchoring in this direction of motion is accomplished through the splined connection 74 of the pressure plate 36 with the cup-shaped member 76. This is best seen in sector *b* of FIGURE 1. With reverse direction of vehicle motion, the engagement of the pressure plate 36 with the rotor 24 tends to cause circumferential movement of the pressure plate in a direction opposite that for forward braking. The interlocking teeth of splined connection 74 abut to transmit to the cup-shaped member 76 the torque reaction from engagement of pressure plate 36 with rotor 24. The torque reaction from engagement of rotor 24 with reaction plate 14 is transmitted to the pressure plate via the backing plate 12 and camming devices 32. With circumferential movement of the pressure plate, the camming devices 32 again produce additional axial thrust thereon, frictionally clamping the rotor 24 between the reaction plate 14 and the pressure plate 36.

When the operator releases the pressure generated in the wheel cylinder 38, return springs 58 retract the pressure plate 36, disengaging its frictional contact with rotor 24 and releasing frictional contact of rotor 24 with reaction plate 14.

Rotor 24 by reason of the circumferentially spaced friction pads 26, acts as a pump driving air through the braking system, the general direction of which is shown in FIGURE 3. The openings 54 in the rotor bypass the inflowing air on either side of the rotor and cause complete circulation of air around the periphery of the brake assembly. The passage of air is then across and between the ramps of the camming devices, and through the openings 56 where the air is expelled to complete the circulation through the system.

Although certain particular embodiments of my invention have been described, it will be understood by those skilled in the art that the object of the invention may be attained by use of constructions different in certain respects from those disclosed without departing from the underlying principles of the invention.

I claim:

1. A disk brake comprising an axially movable U-shaped cross section member having splined connection with a nonrotatable member resisting in one direction relative circumferential movement therebetween, a pressure plate having splined connection with a nonrotatable member resisting in opposite direction relative circumferential movement therebetween, and a splined driven rotor received between the spaced sides of said member and engageable with said pressure plate, the torque reaction thereof being transmitted through the splined connection of said U-shaped cross section member, or said pressure plate depending upon the direction of movement of said rotor.

2. A disk brake comprising a U-shaped cross section annular member having a splined connection with a nonrotatable member and resisting in one direction relative circumferential movement therebetween, a pressure plate mounted adjacent the side of the U-shaped cross section member having said splined connection, said pressure plate also having a splined connection with said nonrotatable member to resist relative circumferential movement therebetween in the direction opposite said first direction of rotation, camming means disposed between said pressure plate and its adjacent side of said U-shaped cross section member to effect lateral displacement therebetween upon their relative circumferential movement, a splined drive rotor located between said pressure plate and the other of said spaced sides to be clamped therebetween as said pressure plate is laterally biased through said camming devices, a torque reaction from engagement of said rotor being transferred to the splined connection of one or the other of said pressure plate and U-shaped member according to the direction of rotation of said rotor.

References Cited in the file of this patent

UNITED STATES PATENTS

| | | |
|---|---|---|
| 1,740,993 | McDonnell | Dec. 24, 1929 |
| 2,014,630 | O'Brien et al. | Sept. 17, 1935 |
| 2,165,978 | Miller | July 11, 1939 |
| 2,225,562 | Lambert | Dec. 17, 1940 |
| 2,262,709 | Lambert | Nov. 11, 1941 |
| 2,655,230 | Buyze | Oct. 13, 1953 |
| 2,753,959 | Johnson | July 10, 1956 |
| 2,910,148 | Ferrell et al. | Oct. 27, 1959 |